United States Patent
Rodriguez Erdmenger et al.

(10) Patent No.: US 9,771,977 B2
(45) Date of Patent: Sep. 26, 2017

(54) GAS BEARING AND AN ASSOCIATED METHOD THEREOF

(71) Applicant: General Electric Company, Schenectady, NY (US)

(72) Inventors: Rodrigo Rodriguez Erdmenger, Munich (DE); Christopher Edward Wolfe, Niskayuna, NY (US); Vittorio Michelassi, Florence (IT); Quang Tue Nguyen Tran, Munich (DE); Nathan Evan McCurdy Gibson, West Chester, OH (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 14/836,406

(22) Filed: Aug. 26, 2015

(65) Prior Publication Data
US 2017/0058951 A1  Mar. 2, 2017

(51) Int. Cl.
*F16C 32/06* (2006.01)
*F16J 15/34* (2006.01)
(Continued)

(52) U.S. Cl.
CPC ...... *F16C 32/0622* (2013.01); *F16C 32/0607* (2013.01); *F16C 32/0618* (2013.01);
(Continued)

(58) Field of Classification Search
CPC .............. F16C 32/0607; F16C 32/0618; F16C 32/0622; F16C 32/72; F16C 33/107; F16C 37/00; F16J 15/34
(Continued)

(56) References Cited

U.S. PATENT DOCUMENTS

| 2,683,635 A | | 7/1954 | Wilcox | |
| 3,137,531 A | * | 6/1964 | Herrmann | F16C 32/067 384/109 |

(Continued)

FOREIGN PATENT DOCUMENTS

| JP | H069761 B2 | * | 2/1994 | ............... | B23Q 1/38 |
| JP | 2001041242 A | * | 2/2001 | ............... | F16C 32/06 |

OTHER PUBLICATIONS

Nakahara et al., "Externally Pressurized Two Layer Film Bearing—Gas Bearing With Liquid Layer", Journal of Tribology, 103(4), 573-577, Oct. 1, 1981, 5 pages.
(Continued)

*Primary Examiner* — Marcus Charles
(74) *Attorney, Agent, or Firm* — Nitin N. Joshi (57) ABSTRACT

Gas bearing for an aspirating seal assembly is disclosed. The gas bearing includes a bearing body having a bearing surface. The gas bearing further includes a first through-hole disposed in the bearing body, and a plurality of second through-holes spaced apart from each other and disposed around the first through-hole. The first through-hole is characterized by a size, and a first central axis. Each second through-hole is characterized by a size, and a second central axis. The second central axis of each second through-hole in the plurality of second through-holes intersects the first central axis at an angle in a range from about 30 degrees to about 150 degrees or at an angle in a range from about −30 degrees to about −150 degrees. Size of at least one through-hole in the plurality of second through-holes is different from the size of the first through-hole.

23 Claims, 9 Drawing Sheets

(51) Int. Cl.
*F16C 33/72* (2006.01)
*F16J 15/40* (2006.01)

(52) U.S. Cl.
CPC ............... *F16J 15/34* (2013.01); *F16J 15/40* (2013.01); *F16C 2360/23* (2013.01); *F16C 2361/00* (2013.01)

(58) Field of Classification Search
USPC ........ 384/108–109, 112–113, 120, 123, 129, 384/134
See application file for complete search history.

(56) References Cited

U.S. PATENT DOCUMENTS

| | | | | |
|---|---|---|---|---|
| 3,308,848 | A * | 3/1967 | Johnson | B64G 7/00 137/615 |
| 3,455,155 | A * | 7/1969 | Greenberg | G01M 9/04 384/99 |
| 3,510,175 | A | 5/1970 | Dee | |
| 3,537,324 | A * | 11/1970 | Evans | G01C 19/20 74/5 R |
| 4,346,947 | A | 8/1982 | Nakahara et al. | |
| 4,410,220 | A * | 10/1983 | Robinson | F16C 32/0696 384/109 |
| 5,848,930 | A | 12/1998 | Jones | |
| 6,123,323 | A * | 9/2000 | Yoneda | B01D 3/16 261/113 |
| 6,379,250 | B2 * | 4/2002 | Adamczyk | A63F 13/06 463/1 |
| 6,729,762 | B2 | 5/2004 | Satou et al. | |
| 8,075,190 | B1 * | 12/2011 | Wadehn | F16C 32/0648 384/100 |
| 8,500,331 | B2 | 8/2013 | Kim et al. | |
| 8,753,014 | B2 * | 6/2014 | Devitt | F16C 32/0618 277/358 |
| 2013/0062819 | A1 | 3/2013 | Eisenstock et al. | |
| 2015/0104124 | A1 * | 4/2015 | Delgado Marquez | F01D 25/166 384/119 |

OTHER PUBLICATIONS

Nishio et al., "Numerical calculation and experimental verification of static and dynamic characteristics of aerostatic thrust bearings with small feedholes", Tribology International, Science Direct., vol. 44, Issue 12, Nov. 2011, pp. 1790-1795.

* cited by examiner

GAS BEARING AND AN ASSOCIATED METHOD THEREOF

BACKGROUND

The present disclosure relates to bearings, and, more particularly to gas bearings for aspirating seal assembly.

Rotary machines, such as gas turbines, are often used either for generating power with electric generators or for aircraft propulsion. At least some known rotary machines use aspirating seal assemblies to reduce leakage through a gap/clearance defined between stationary and rotating components of the gas turbine. Aspirating seal assemblies are non-contacting seals that typically operate with a tight clearance between the stationary and rotating components. Specifically, such aspirating seal assemblies include gas bearings to maintain the tight clearance between the rotating and stationary components. Gas bearings have a through-hole for injecting a pressurized gas against a rotating surface of the rotating component. The injection of pressurized gas may produce a film of the pressurized gas between the rotating surface and a stationary surface of the stationary component. Such a film generally functions as a load-bearing interface between the surfaces.

The load-bearing capacity of the gas bearings with the through-hole, decreases when there is a substantially large clearance between the surfaces. In such scenarios, the gas bearings may further include a counter bore or a recess disposed on the bearing surface and around the through-hole formed in the stationary component, and in gas communication with the through-hole to improve the load-bearing capacity of the gas bearings. Such counter bores may further create pressurized pockets around the surfaces to improve the load-bearing capacity of the gas bearings. However, during events such as rubbing of the surfaces against each other, the counter bore may get eroded. The erosion of the counter bores may reduce the load bearing capacity of the gas bearings and thereby affect stability and robustness of the gas bearings.

Accordingly, there is a need for an improved gas bearings and associated methods for improving a load bearing capacity of the gas bearings.

BRIEF DESCRIPTION

In accordance with one aspect of the present description, a gas bearing is disclosed. The gas bearing includes a bearing body having a bearing surface. The gas bearing further includes a first through-hole disposed in the bearing body and a plurality of second through-holes spaced apart from each other and disposed around the first through-hole. The first through-hole is characterized by a size and a first central axis. Similarly, each second through-hole is characterized by a size and a second central axis. The second central axis of each second through-hole in the plurality of second through-holes intersects the first central axis at an angle in a range from about 30 degrees to about 150 degrees or at an angle in a range from about −30 degrees to about −150 degrees. Further, a size of at least one through-hole in the plurality of second through-holes is different from the size of the first through-hole. The first through-hole is configured to form a layer of a first pressurized gas in a gap defined between the bearing surface and a rotor surface opposite to the bearing surface. The plurality of second through-holes is configured to form at least one region of a second pressurized gas around the first through-hole such that at least a portion of the first pressurized gas is substantially blocked from leaking through the gap.

In accordance with another aspect of the present description, a machine is disclosed. The machine includes a stator assembly and a rotor assembly including a rotor disposed within the stator assembly. Further, the machine includes an aspirating seal assembly coupled to the stator assembly and disposed between the stator assembly and the rotor. The aspirating seal assembly includes a gas bearing and a plurality of components. The gas bearing includes a bearing body having a bearing surface. The gas bearing further includes a first through-hole disposed in the bearing body and a plurality of second through-holes spaced apart from each other and disposed around the first through-hole. The first through-hole is characterized by a size and a first central axis. Similarly, each second through-hole is characterized by a size and a second central axis. The second central axis of each second through-hole in the plurality of second through-holes intersects the first central axis at an angle in a range from about 30 degrees to about 150 degrees or at an angle in a range from about −30 degrees to about −150 degrees. Further, a size of at least one through-hole in the plurality of second through-holes is different from the size of the first through-hole. The first through-hole is configured to form a layer of a first pressurized gas in a gap defined between the bearing surface and a rotor surface opposite to the bearing surface. The plurality of second through-holes is configured to form at least one region of a second pressurized gas around the first through-hole such that at least a portion of the first pressurized gas is substantially blocked from leaking through the gap.

In accordance with yet another aspect of the present description, a method of increasing a load bearing capacity of a gas bearing included in an aspirating seal assembly is disclosed. The method includes rotating a rotor of a rotor assembly, disposed within a stator assembly of a machine, and injecting a first pressurized gas from the gas bearing against a rotor surface through a first through-hole disposed in a bearing body of the gas bearing. The first through-hole is characterized by a size and a first central axis. The method further includes forming a layer of the first pressurized gas in a gap defined between the rotor surface and a bearing surface opposite to the rotor surface, and injecting a second pressurized gas from the gas bearing against the rotor surface through a plurality of second through-holes spaced apart from each other and disposed around the first through-hole. Each second through-hole is characterized by a size and a second central axis. Further, the method includes forming at least one region of the second pressurized gas around the first through-hole such that the at least a portion of the first pressurized gas is substantially blocked from leaking through the gap. The second central axis of each second through-hole in the plurality of second through-holes intersects the first central axis at an angle in a range from about 30 degrees to about 150 degrees or at an angle in a range from about −30 degrees to about −150 degrees. Further a size of at least one through-hole in the plurality of second through-holes is different from the size of the first through-hole.

DRAWINGS

These and other features and aspects of embodiments of the present technique will become better understood when the following detailed description is read with reference to the accompanying drawings in which like characters represent like parts throughout the drawings, wherein.

DETAILED DESCRIPTION

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

Unless defined otherwise, technical and scientific terms used herein have the same meaning as is commonly understood by one of skill in the art to which this invention belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another. In the following specification and the claims that follow, the singular forms "a", "an" and "the" include plural referents unless the context clearly dictates otherwise.

In some embodiments, a gas bearing is presented. In accordance with one embodiment, the gas bearing is configured to form a layer of a first pressurized gas in a gap defined between a bearing surface and a rotor surface opposite to the bearing surface, by injecting the first pressurized gas via a first through-hole disposed in a bearing body. Further, the gas bearing is configured to form at least one region of a second pressurized gas around the first through-hole such that at least a portion of the first pressurized gas is substantially blocked from leaking through the gap. The second pressurized gas is injected via a plurality of second through-holes spaced apart from each other and disposed around the first through-hole. In such embodiments, the first through-hole is characterized by a size and a first central axis, and each second through-hole in the plurality of second through-holes is characterized by a size and a second central axis. The second central axis of each second through-hole in the plurality of second through-holes intersects the first central axis at an angle in a range from about 30 degrees to about 150 degrees or at an angle in a range from about −30 degrees to about −150 degrees. Further, a size of at least one through-hole in the plurality of second through-holes is different from the size of the first through-hole.

Figure 1:
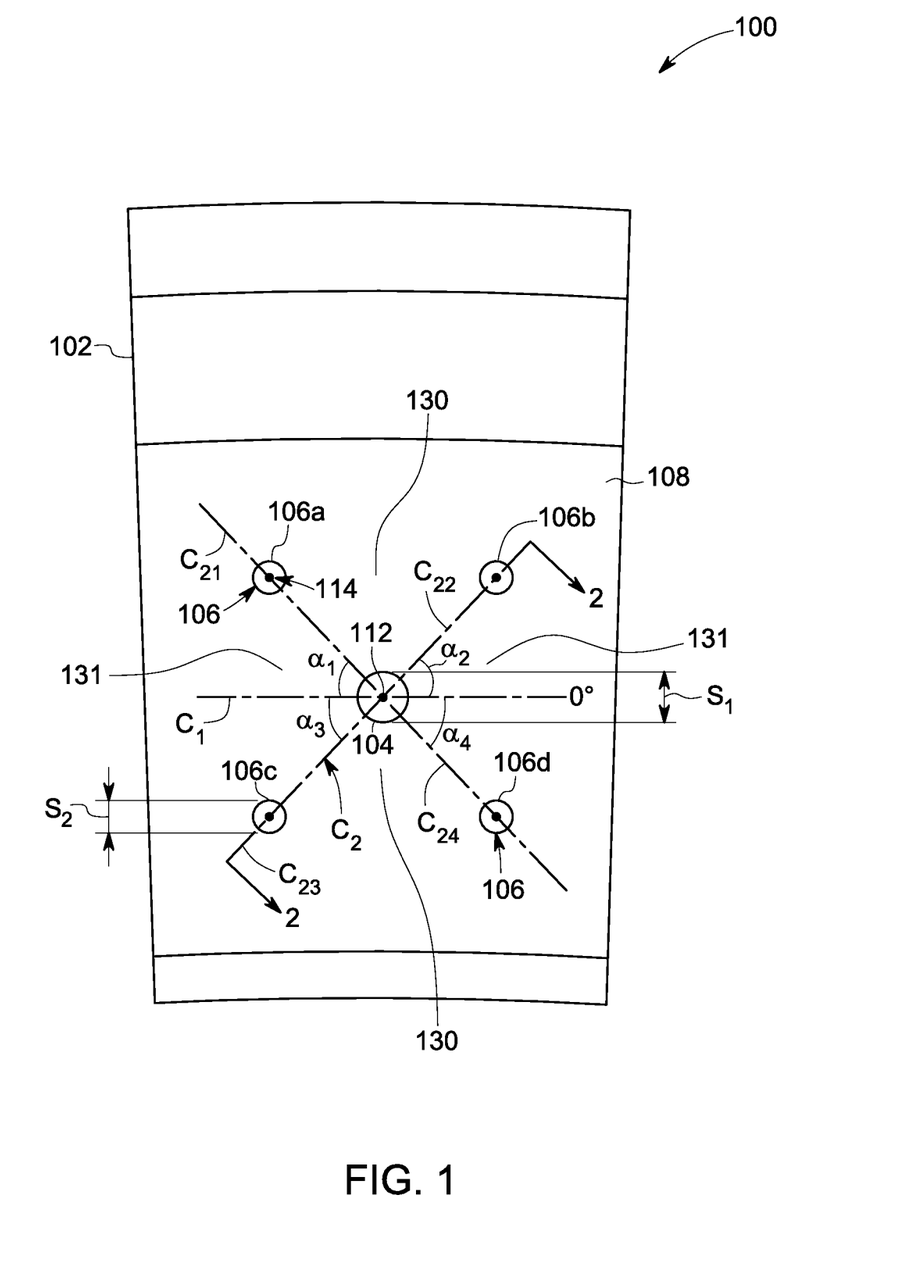
FIG. 1 is a block diagram of a gas bearing, in accordance with one embodiment.
Figure 2:
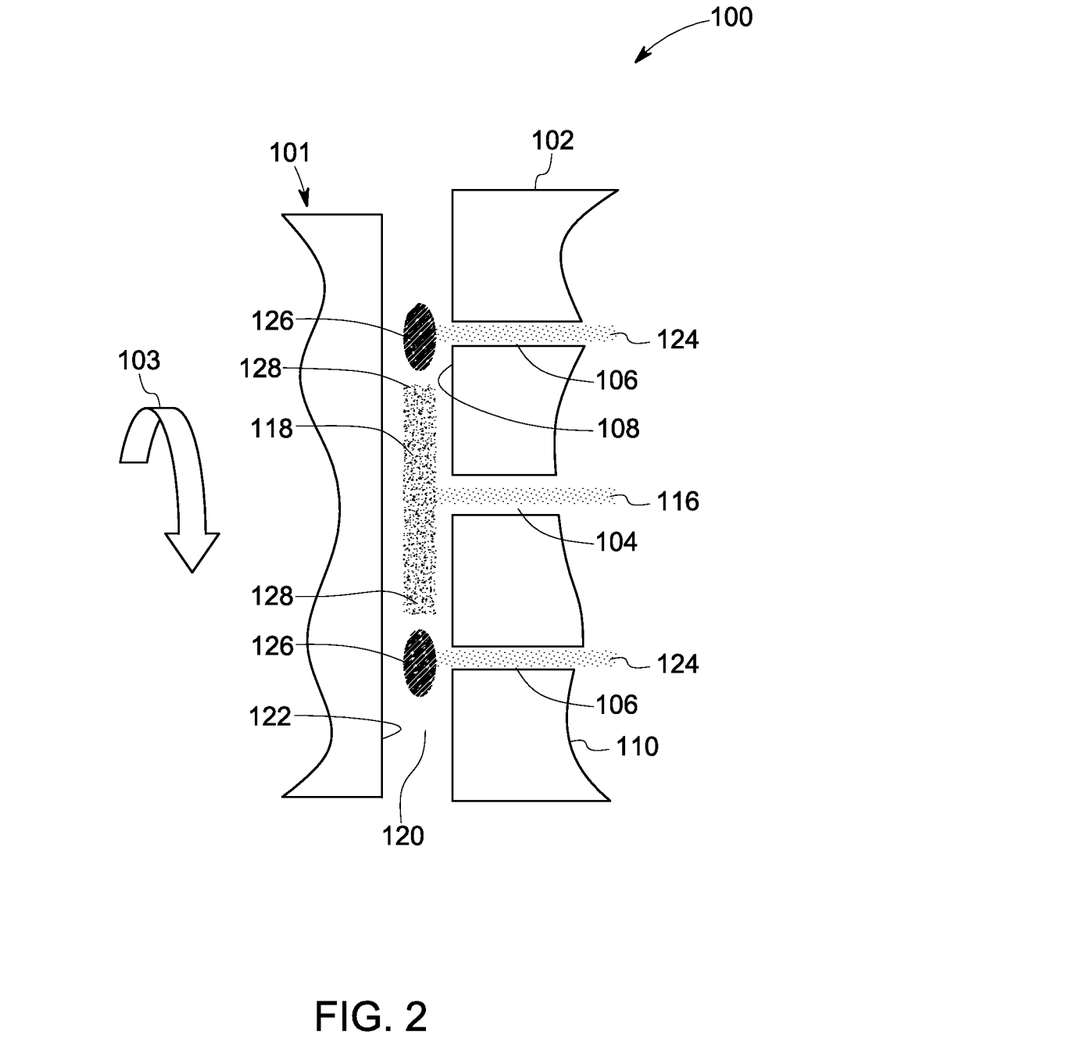
FIG. 2 is a cross-sectional view of a rotor and the gas bearing taken along line FIG. 2-2 in FIG. 1, in accordance with one embodiment.

FIG. 1 illustrates a block diagram of a gas bearing 100 according to one embodiment. The block diagram shown in FIG. 1 may represent a front view of the gas bearing 100. FIG. 2 illustrates a cross-sectional view of the gas bearing 100 taken along line FIG. 2-2 of FIG. 1. FIG. 2 further illustrates a cross-sectional view of a rotor 101 disposed opposite to the gas bearing 100 according to some embodiments.

Figure 12:
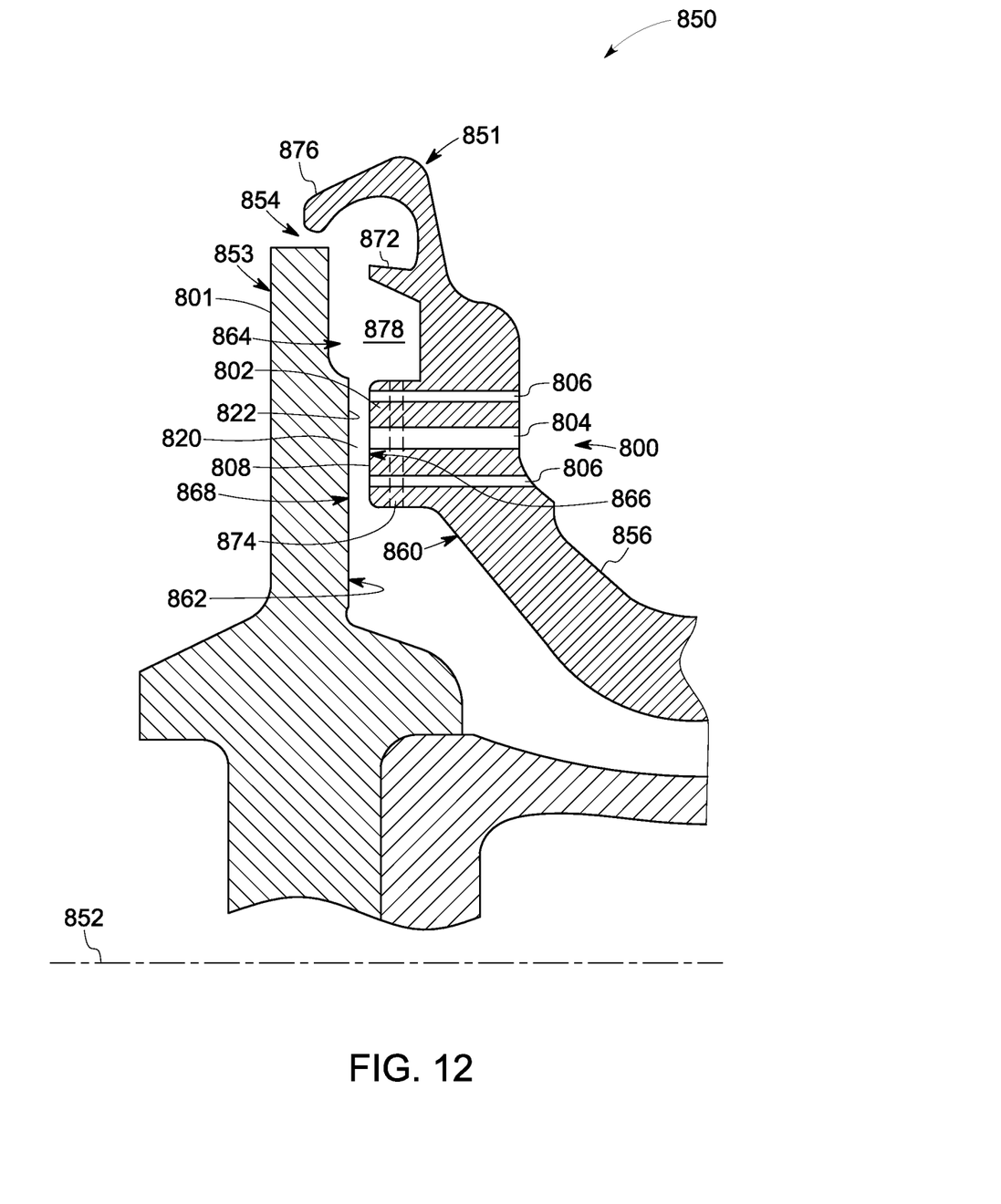
FIG. 12 is a cross-sectional view of a machine including an aspirating seal assembly and a gas bearing disposed therein, in accordance with one embodiment.

In one embodiment, the gas bearing 100 may be located opposite to the rotor 101 of a machine 850 (as shown in FIGS. 2 and 12). In one embodiment, during operation, the rotor 101 may rotate, as shown by reference numeral 103, about the axis 852 (as shown in FIG. 12) of the machine 850. The gas bearing 100 may be configured to support the rotating rotor 101 and sustain load exerted by the rotating rotor 101. In certain embodiments, the rotor 101 may additionally move axially along the axis 852 of the machine 850.

The gas bearing 100 includes a bearing body 102, a first through-hole 104, and a plurality of second through-holes 106. In some embodiments, the bearing body 102 is a metallic material. The bearing body 102 may be made of any suitable material without deviating from the scope of the description. In the embodiment illustrated in FIG. 2, the bearing body 102 has a circular profile. However, a bearing body 102 having any suitable profile is envisioned in the present application without deviating from the scope of the present description.

The bearing body 102 further includes a first surface 108 (hereinafter also referred to as a "bearing surface") and a second surface 110 located opposite to the first surface 108. The bearing body 102 may be coupled to one or more gas sources (not shown in FIGS. 1 and 2) for receiving a pressurized gas during operation. Specifically, the one or more gas sources may be coupled to the second surface 110 of the gas bearing 100.

The first through-hole 104 is disposed in the bearing body 102 and extends from the first surface 108 to the second surface 110. In the embodiment illustrated in FIG. 2, the first through-hole 104 is disposed substantially at a center of the bearing body 102 and has a circular profile. In some other embodiments, the first through-hole 104 may have any suitable profile such as rectangular, square, or oval. The first through-hole 104 is further characterized by a size "$S_1$", and a first central axis "$C_1$". The term "first central axis" as used in this context refers to an axis passing through a mid-point 112 of the first through-hole 104 on the bearing surface 108. In the illustrated embodiment, the first central axis "$C_1$" is a horizontal axis passing through the mid-point 112 of the first through-hole 104 and is aligned at about 0 degree. The term "size" as used in this context refers to a dimension of the first through-hole 104 on the bearing surface 108. In the illustrated embodiment in FIG. 1, the size "$S_1$" refers to a diameter of the first through-hole 104. In some other embodiments, for example, wherein the first through-hole 104 has a rectangular profile, the size "$S_1$" may refer to a width of the rectangular profile.

The plurality of second through-holes 106 is spaced apart from each other and disposed around the first through-hole 104. Similar to the first through-hole 104, each second through-hole 106 is disposed in the bearing body 102 and extends from the first surface 108 to the second surface 110. In the embodiment illustrated in FIGS. 1 and 2, each second through-hole 106 has a circular profile. In some other embodiments, at least one through-hole in the plurality of second through-holes 106 may have profile different from a circular profile, for example, at least one through-hole in the plurality of second through-holes 106 may have a rectangular profile. Similarly, in some embodiments, at least one through-hole in the plurality of second through-holes 106 may have a square profile. Various such combinations of profiles for the plurality of second through-holes 106 are envisioned without deviating from the scope of the present description.

Each second through-hole 106 is further characterized by a size "$S_2$", and a second central axis "$C_2$". The term "second central axis" as used in this context refers to an axis passing through a mid-point 114 of each second through-hole 106 on the bearing surface 108. In the illustrated embodiment, the second central axis "$C_2$" is inclined at an angle relative to the first central axis "$C_1$" and passes through the mid-point 114 of each second through-hole 106. In one embodiment, the second central axis "$C_2$" of each second through-hole 106 intersects the first central axis "$C_1$" of the first through-hole 104 at an angle in a range from about 30 degrees to about 150 degrees or at an angle in a range from about −30 degrees to about −150 degrees. In certain embodiments, the intersection angle of the first and second central axes "$C_1$" and "$C_2$" may be in a range from about 60 degrees to about 120 degrees or may be in a range from about −60 degrees to about −120 degrees.

In the illustrated embodiment of FIG. 1, a through-hole 106a in the plurality of second through-holes 106 is characterized by a second central axis "$C_{21}$", a through-hole 106b in the plurality of second through-holes 106 is characterized by a second central axis "$C_{22}$", a through-hole 106c in the plurality of second through-holes 106 is characterized by a second central axis "$C_{23}$", and a through-hole 106d in the plurality of second through-holes 106 is characterized by a second central axis "$C_{24}$".

In the illustrated embodiment, the second central axis "$C_{21}$" of the second through-hole 106a in the plurality of second through-holes 106 intersects the first central axis "$C_1$" at an angle "$\alpha_1$" in a range from about 120 degrees to about 150 degrees. The second central axis "$C_{22}$" of the second through-hole 106b in the plurality of second through-holes 106 intersects the first central axis "$C_1$" at an angle "$\alpha_2$" in a range from about 30 degrees to about 60 degrees. In certain embodiments, the angles "$\alpha_1$" and "$\alpha_2$" are referred as a positive angle. The second central axis "$C_{23}$" of the second through-hole 106c in the plurality of second through-holes 106 intersects the first central axis "$C_1$" at an angle "$\alpha_3$" in a range from about −120 degrees to about −150 degrees. The second central axis "$C_{24}$" of the second through-hole 106d in the plurality of second through-holes 106 intersects the first central axis "$C_1$" at an angle "$\alpha_4$" in a range from about −30 degrees to about −60 degrees. In certain embodiments, the angles "$\alpha_3$" and "$\alpha_4$" are referred to as a negative angle. In the embodiment illustrated in FIG. 1, each axis in the second central axes "$C_{21}$-$C_{24}$" is inclined at a uniform angle. In some embodiments, at least one axis in the second central axes "$C_{21}$-$C_{24}$" may be inclined at an angle different from the inclination angle of the other axes.

The term "size" as used in this context refers to a dimension of each through-hole in the plurality of second through-holes 106 on the bearing surface 108. In the illustrated embodiment, the size "$S_2$" refers to a diameter of each second through-hole 106. The through-holes in the plurality of second through-holes 106 may be of the same size or different size. In one embodiment, all second through-holes have a constant and uniform size "$S_2$" as illustrated in the FIG. 2. In another embodiment, the size of the second through-hole 106a may be different from that of the second through-hole 106b. In some other embodiments, for example, wherein the plurality of second through-holes 106 has a rectangular profile, the size "$S_2$" may refer to a width of the rectangular profile.

In one embodiment, the size "$S_2$" of at least one second through-hole 106 is different from the size "$S_1$" of the first through-hole 104. In the illustrated embodiment, the size "$S_1$" of first through-hole 104 is greater than the size "$S_2$" of the plurality of second through-holes 106. The first through-hole 104 having a size greater than that at least one second through-hole 106 may provide a substantially greater load bearing capacity to the gas bearing 100. In some embodiment, the size "$S_1$" may be in a range from about 30 mils to about 100 mils and the size "$S_2$" may be in a range from about 15 mils to about 400 mils. In one embodiment, a relative ratio of the sizes "$S_2$" and "$S_1$" may be in range from about 0.3 to about 1.0.

During operation, the rotor 101 is rotated as shown by reference numeral 103, about the axis 852 of the machine 850 (FIGS. 2 and 12). The first pressurized gas 116 is injected through the first through-hole 104, and is configured to form a layer 118 of the first pressurized gas 116 in a gap 120 defined between the bearing surface 108 and a rotor surface 122 opposite to the bearing surface 108. Similarly, a second pressurized gas 124 is injected through the plurality of second through-holes 106, and is configured to form at least one region 126 of the second pressurized gas 124 around the first through-hole 104 such that at least a portion of the first pressurized gas 116 is substantially blocked from leaking through the gap 120. The term "gas" as used herein refers to both gases and gaseous mixtures. In some embodiments, at least one of the first pressurized gas 116 and the second pressurized gas 124 includes air, nitrogen, carbon dioxide, natural gas, superheated steam, or combinations thereof. In some embodiments, at least one of the first pressurized gas 116 and the second pressurized gas 124 includes a mixture of gases. In one embodiment, at least one of the first pressurized gas 116 and the second pressurized gas 124 includes compressed air. In one embodiment, both the first pressurized gas 116 and the second pressurized gas 124 includes compressed air.

The region 126 may also be referred as a stagnation region. In one embodiment, the stagnation region 126 may establish a high pressure area of second pressurized gas 124 around at least a portion 128 of the layer 118 thereby blocking at least the portion 128 of the first pressurized gas 116 from leaking through the gap 120. In certain embodiments, the portion 128 of the layer 118 may relate to one or more regions in the layer 118 where a static pressure established by the first pressurized gas 116 is substantially low, thereby causing the first pressurized gas 116 to leak through the gap 120.

Further, the layer 118 and the region 126 may function as a load-bearing interface between the bearing surface 108 and the rotor surface 122. The layer 118 and the region 126 may also help in maintaining the gap 120 between the surfaces 108, 122. In some embodiments, the gap 120 may be in a range from about 1 mil to about 20 mils.

In the embodiments discussed herein, the plurality of second through-holes 106 is disposed only within one or more first sections 130 of the bearing body 102 defined by the intersecting central axes "$C_1$", "$C_2$". The one or more first sections 130 may be confined to specific areas in the gas bearing 100 where the static pressure established by the layer 118, for sustaining the load exerted by the rotor 101, is substantially low. According to some embodiments, the plurality of second through-holes 106 may be precluded from being disposed within one or more second sections 131 of the bearing body 102 where the static pressure established by the layer 118, for sustaining the load exerted by the rotor 101, is substantially high. The one or more second sections 131 refer to regions outside the intersecting central axes "$C_1$", "$C_2$" on the bearing body 102. In such embodiments, the stagnation region 126 may strengthen the layer 118 by substantially blocking at least a portion of the first pressurized gas 116 from leaking through the gap 120, thereby improving the load-bearing capacity of the gas bearing 100. In some embodiments, the plurality of second through-holes 106 is not disposed completely around the first through-hole 104, that is, the first through-hole 104 is not entirely surrounded by the plurality of second through-holes 106.

Figure 3:
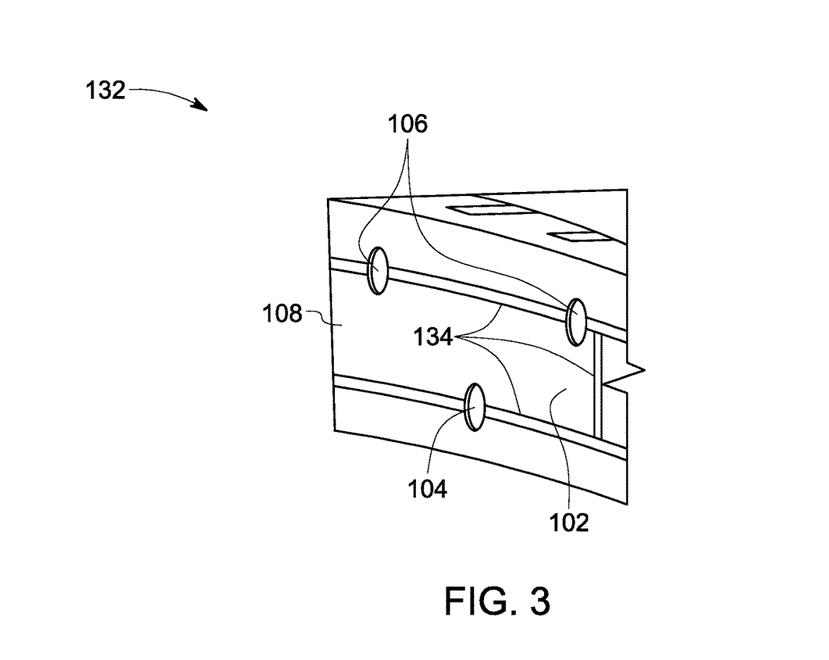
FIG. 3 is a perspective view of a portion of a gas bearing including a plurality of grooves, in accordance with one embodiment.

FIG. 3 illustrates a perspective view of a portion 132 of a gas bearing 100 according to one embodiment. In the illustrated embodiment, the gas bearing 100 includes a bearing body 102, a first through-hole 104, and a plurality of second through-holes 106. The gas bearing 100 further includes a plurality of grooves 134 disposed on a bearing surface 108 connecting at least some of the plurality of second through-holes 106 with the first through-hole 104. The plurality of grooves 134 may enable circulation of one or both of the first pressurized gas 116 and the second pressurized gas 124 (as shown in FIG. 2) between the first through-hole 104 and the plurality of second through-holes 106, thereby regulating pressure of a layer 118 and a region 126 (as shown in FIG. 2) for bearing load of the rotor and maintaining the gap between the rotor surface 122 and the bearing surface 108.

Figure 4:
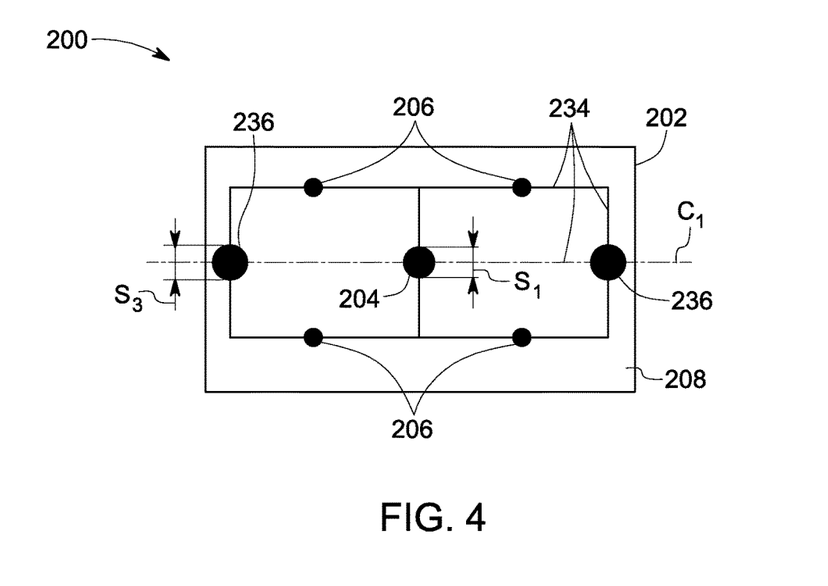
FIG. 4 is a block diagram of a gas bearing, in accordance with one embodiment.

FIG. 4 illustrates a block diagram of a gas bearing 200 according to one embodiment. In the embodiment illustrated in FIG. 4, the gas bearing 200 includes a bearing body 202, a first through-hole 204, a plurality of second through-holes 206, and a plurality of third through-holes 236. Each third through-hole 236 is spaced apart from each other and disposed along a first central axis "$C_1$" of the first through-hole 204. Further, at least one through-hole in the plurality of third through-holes 236 is characterized by a size "$S_3$", which is substantially equal to a size "$S_1$" of the first through-hole 204. The plurality of third through-holes 236 is configured to direct a first pressurized gas against a rotor surface 122 (as shown in FIG. 2). In the illustrated embodiment, the first through-hole 204, the plurality of third through-holes 236, and the plurality of second through-holes 206 have a circular profile. However, any other profile as mentioned earlier is further envisaged within the scope of the description.

In some embodiments, a plurality of grooves 234 is disposed on a bearing surface 208, and connects at least some of the plurality of second through-holes 206 with the first through-hole 204 and at least some of the plurality of third through-holes 236. As discussed earlier with reference to the embodiment of FIG. 3, the plurality of grooves 234 is configured for circulating at least a portion of one of a first pressurized gas 116 and a second pressurized gas 124 (as shown in FIG. 2) between the through-holes 204, 204, and 236. The circulation of pressurized gas regulates pressure of a layer 118 and a stagnation region 126 (as shown in FIG. 2) for bearing load of the rotor and maintaining the gap 120 between the rotor surface 122 and the bearing surface 208.

Figure 5:
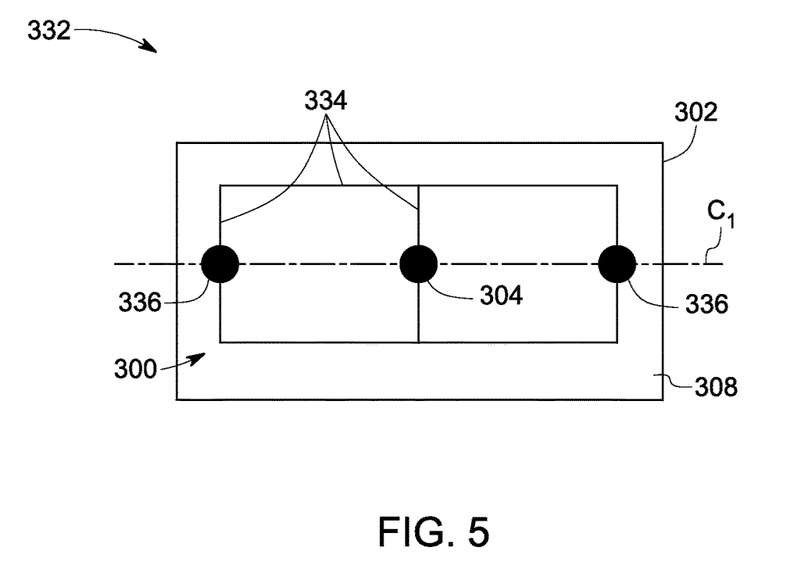
FIG. 5 is a block diagram of a portion of a gas bearing, in accordance with one embodiment.

FIG. 5 illustrates a block diagram of a portion 332 of a gas bearing 300 according to one embodiment. In the embodiment illustrated in FIG. 5, the portion 332 includes a bearing body 302, a first through-hole 304, and a plurality of third through-holes 336. In the illustrated embodiment, the first through-hole 304 and the plurality of third through-holes 336 have a circular profile. However, any other profile as mentioned earlier is further envisaged within the scope of the description. The first through-hole 304 is connected with at least some of the third through-holes in the plurality of third through-holes 336 via a plurality of grooves 334 formed on a bearing surface 308 of the gas bearing 300. As noted earlier, the bearing 300 may further include a plurality of second through-holes (not shown in FIG. 5) disposed around the first through-hole 304 and the plurality of third through-holes 336. The plurality of grooves 334 is configured to circulate a first pressurized gas 116 (as shown in FIG. 2) between the first through-hole 304 and the plurality of third through-holes 336.

Figure 6:
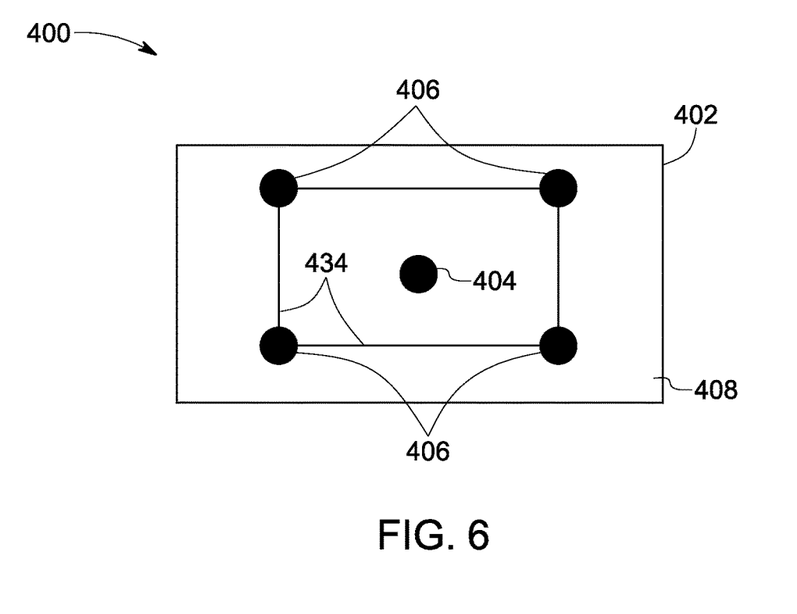
FIG. 6 is a block diagram of a gas bearing, in accordance with one embodiment.

FIG. 6 illustrates a block diagram of a gas bearing 400 according to one embodiment. In one embodiment, the gas bearing 400 includes a bearing body 402, a first through-hole 404, and a plurality of second through-holes 406. In the illustrated embodiment, the first through-hole 404 and the plurality of second through-holes 406 have a circular profile. However, any other profile as mentioned earlier is further envisaged within the scope of the description. The plurality of second through-holes 406 is connected to each other via a plurality of grooves 434 formed on a bearing surface 408 of the gas bearing 400. The plurality of grooves 434 is configured to circulate a second pressurized gas 124 (as shown in FIG. 2) between the through-holes in the plurality of second through-holes 406. In such embodiments, the first through-hole 404 is not connected to the plurality of second through-holes 406 via the plurality of grooves 434.

Figure 7:
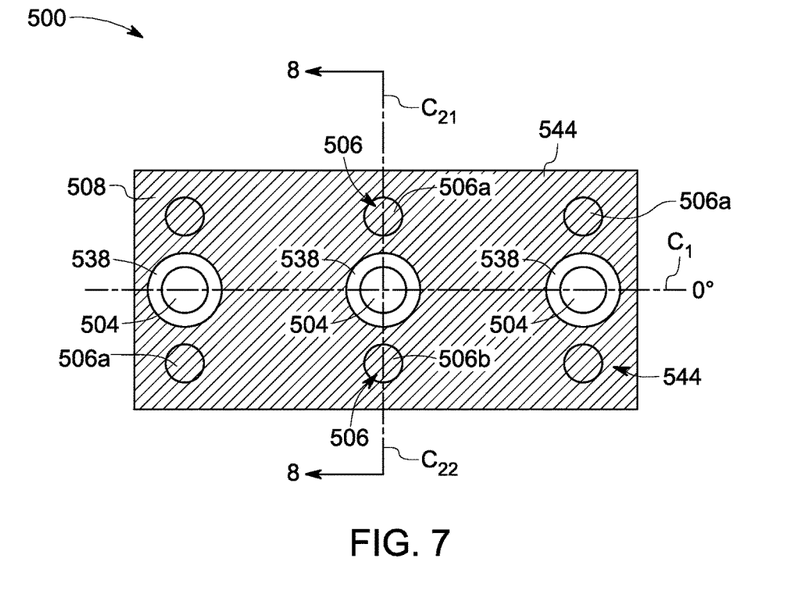
FIG. 7 is a block diagram of a gas bearing having an abradable material, in accordance with one embodiment.
Figure 8:
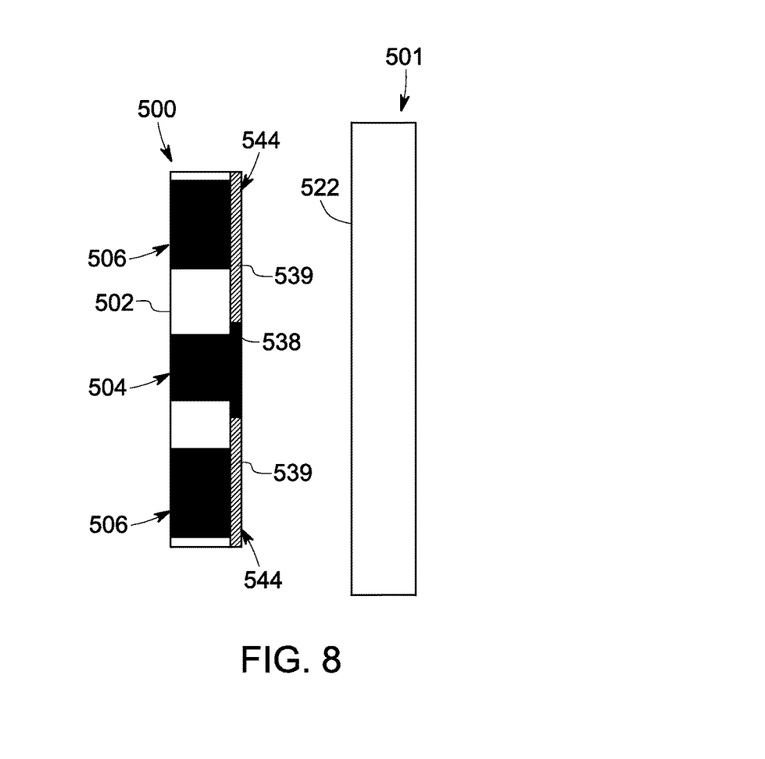
FIG. 8 is a cross-sectional view of a rotor and the gas bearing taken along line FIG. 8-8 in FIG. 7, in accordance with one embodiment.

FIG. 7 illustrates a block diagram of a gas bearing 500 and FIG. 8 is a cross-sectional view of a rotor 501 and the gas bearing 500 taken along line FIG. 8-8 in FIG. 7 according to one embodiment.

The gas bearing includes a bearing body 502, a first through-hole 504, a plurality of second through-holes 506, a counter bore 538, and an abradable material 544. In the illustrated embodiment, the plurality of second through-holes 506 includes a through-hole 506a and another through-hole 506b. In such embodiments, a second central axis "$C_{21}$" of the through-hole 506a intersects a first central axis "$C_1$" of the first through-hole 504 at about 90 degrees. Similarly, another second central axis "$C_{22}$" of the other through-hole 506b intersects the first central axis "$C_1$" at about −90 degrees. In the illustrated embodiment, the counter bore 538 is disposed around the first through-hole 504 and is in gas communication with the first through-hole 504. The counter bore 538 may be configured to create pressurized pockets of the first pressurized gas (not shown) around the surfaces 508, 522 (shown in FIGS. 7 and 8) to improve the load-bearing capacity of the gas bearing 500.

The abradable material 544 is disposed along the bearing surface 508, around the first through-hole, and over the plurality of second through-holes 506. In one embodiment, the term "abradable material" refers to a material which is susceptible to wear during a rub event with the rotor 501. The abradable material 544 may include a metallic or a non-metallic material. The abradable material 544 is configured to block the second pressurized gas (as shown in FIG. 2) from being injected against the rotor surface 522 via the plurality of second through-holes 506. In one embodiment, during an event such as, rubbing of the surfaces 522, 508, a portion of the abradable material 544 may get eroded, thereby exposing the plurality of second through-holes 506, for directly injecting the second pressurized gas 124 against the rotor surface 522.

Figure 9:
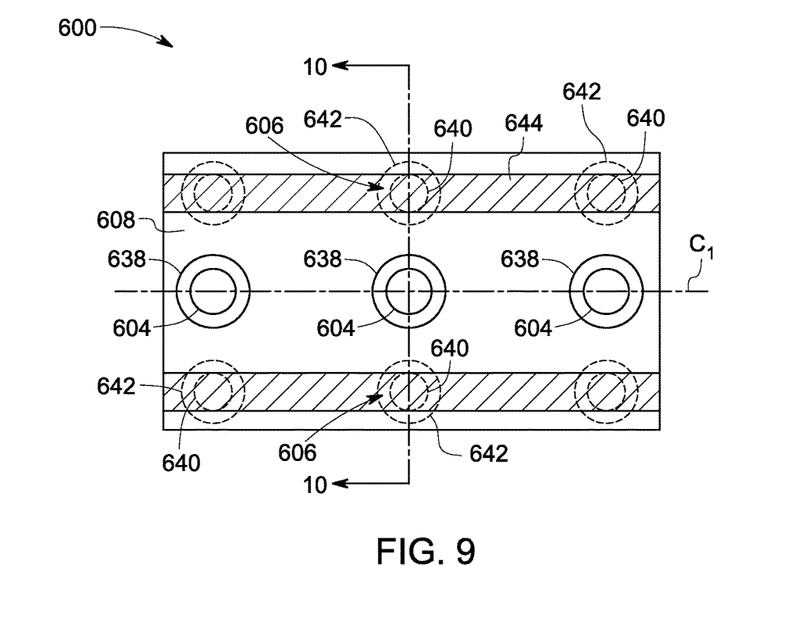
FIG. 9 is a block diagram of a gas bearing having a porous material, in accordance with one embodiment.
Figure 10:
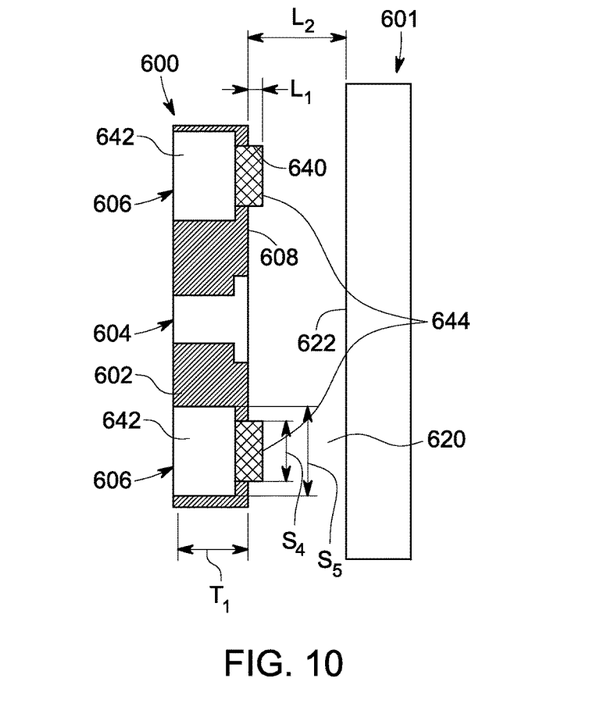
FIG. 10 is a cross-sectional view of a rotor and the gas bearing taken along line FIG. 10-10 in FIG. 9, in accordance with one embodiment.

FIG. 9 illustrates a block diagram of a gas bearing 600, and FIG. 10 is a cross-sectional view of a rotor 601 and the gas bearing 600 taken along line FIG. 10-10 in FIG. 9 according to one embodiment.

In one embodiment, the gas bearing 600 includes a bearing body 602, a first through-hole 604, a plurality of second through-holes 606, and a counter bore 638. In the illustrated embodiment, the counter bore 638 is disposed around the first through-hole 604 and is in gas communication with the first through-hole 604. The counter bore 638 may be configured to create pressurized pockets of the first pressurized gas (not shown in FIGS. 9 and 10) around the surfaces 608, 622 to improve the load-bearing capacity of the gas bearing 600.

At least some through-holes in the plurality of second through-holes 606 include a first portion 640 and a second portion 642 along the thickness "$T_1$" of the bearing body 602. The first portion 640 is characterized by a size "$S_4$" and the second portion 642 is characterized by a size "$S_5$" different than that of "$S_4$". In the illustrated embodiment, the size "$S_4$" is smaller than size "$S_5$". A second through-hole 606 that varies in size may enable increase in the injection rate of the second pressurized gas 124 (as shown in FIG. 2) against the rotor surface 622.

The gas bearing 600 further includes a porous material 644 disposed within the first portion 640 and extends beyond the bearing surface 608 into a gap 620 formed between the rotor surface 622 and a bearing surface 608. The porous material 644 may extend about a length "$L_1$" from the bearing surface 608 into the gap 620. The gap 620 may have a length "$L_2$" which is larger than length "$L_1$". Such porous material 644 may increase the stiffness of the gas bearing 600 at tighter gap/clearance. In some embodiments, the porous material 644 may be in a form of a strip disposed continuously along the bearing surface 608. In one embodiment, the term "porous material" refers to a material having a plurality of pores for allowing a second pressurized gas 124 to flow through the porous material. The porous material feeds at least a portion of the second pressurized gas 124 via the plurality of pores against the rotor surface 622. In some embodiments, the porous material 644 may be disposed such that the porous material 644 is flush with the bearing surface 608 (not shown in figures). Such porous material 644 may moderately increase the stiffness of the gas bearing 600 at tighter gap/clearance. Further, as discussed in the embodiment of FIGS. 1 and 2, the first pressurized gas 116 (as shown in FIG. 2) is injected through the first through-hole 604 to form a layer 118 of the first pressurized gas 116 in the gap 620 defined between the rotor surface 622 and the bearing surface 608. The second pressurized gas 124 is injected through the plurality of second through-holes 606 and the porous material 644, against the rotor surface 622 to form at least one region 126 (as shown in FIG. 2) of the second pressurized gas 124 around the first through-hole 604 such that the first pressurized gas 116 is substantially blocked from leaking through the gap 620. In one embodiment, during an event such as, rubbing of the surfaces 622, 608, a portion of the porous material 644 may get eroded, thereby exposing the first portion 640 of the second through-hole 606, for directly injecting the second pressurized gas 124 against the rotor surface 622.

Figure 11:
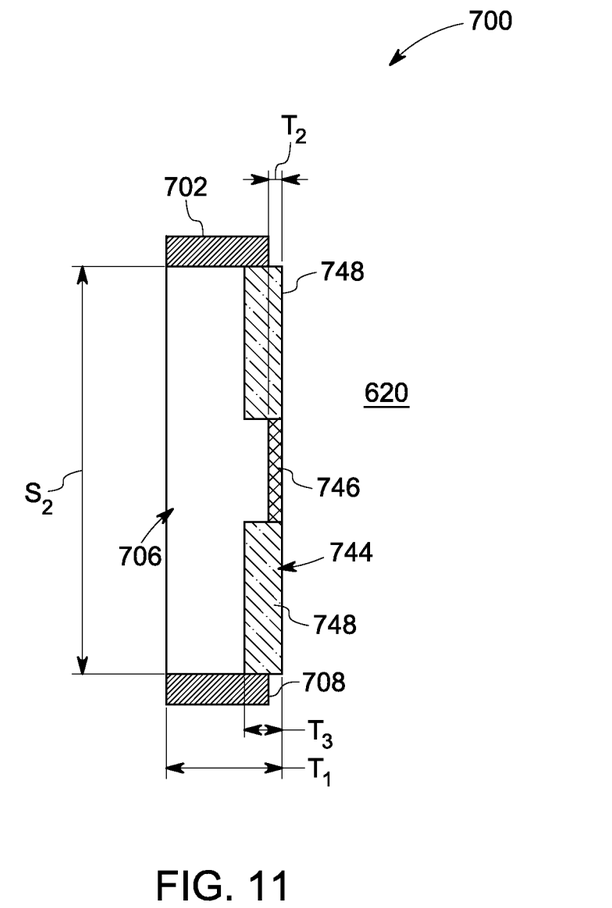
FIG. 11 is a cross-sectional view of one through-hole in a plurality of second through-holes of a gas bearing, having a porous material, in accordance with one embodiment.

FIG. 11 illustrates a cross-sectional view of one through-hole in the plurality of second through-holes 706 of a gas bearing 700 according to one embodiment. In the illustrated embodiment, the second through-hole 706 has a uniform size "$S_2$" along the thickness "$T_1$" of a bearing body 702. A porous material 744 is disposed within the second through-hole 706 and extends beyond a bearing surface 708 into a gap 620 (as shown in FIG. 10). The porous material 744 has a first portion 746 characterized by a first thickness "$T_2$" and a second portion 748 characterized by a second thickness "$T_3$" different from the first thickness "$T_2$". In the illustrated embodiment, the thickness "$T_2$" is smaller than the thickness "$T_3$". In some embodiments, the porous material 744 may be disposed such that the porous material 744 is flush with the bearing surface 708 (not shown in figures).

The porous material 744 is configured to feed at least a portion of the second pressurized gas 116 (as shown in FIG. 2) against a rotor surface. During an event such as, rubbing of rotor surface with the bearing surface 708, a first portion 746 of the porous material 744 may get eroded faster than the second portion 748 of the porous material 744, thereby exposing a portion of the second through-hole 706 corresponding to the first portion 746 of the porous material 744, for directly injecting the second pressurized gas 116 against the rotor surface.

In one embodiment a machine is presented. The machine includes a stator assembly, and a rotor assembly comprising a rotor disposed within the stator assembly. Further, the machine includes an aspirating seal assembly coupled to the stator assembly and disposed between the stator assembly and the rotor. The aspirating seal assembly includes a gas bearing and a plurality of components. The gas bearing includes a bearing body having a bearing surface. The gas bearing further includes a first through-hole disposed in the bearing body and a plurality of second through-holes spaced apart from each other and disposed around the first through-hole. The first through-hole is characterized by a size and a first central axis. Similarly, each second through-hole is characterized by a size and a second central axis. The second central axis of each second through-hole in the plurality of second through-holes intersects the first central axis at an angle in a range from about 30 degrees to about 150 degrees or at an angle in a range from about −30 degrees to about −150 degrees. Further, a size of at least one through-hole in the plurality of second through-holes is different from the size of the first through-hole. The first through-hole is configured to form a layer of a first pressurized gas in a gap defined between the bearing surface and a rotor surface opposite to the bearing surface. The plurality of second through-holes is configured to form at least one region of a second pressurized gas around the first through-hole such that at least a portion of the first pressurized gas is substantially blocked from leaking through the gap.

FIG. 12 is a cross-sectional view of a portion of a machine 850 according to one embodiment. The machine 850 includes a stator assembly 851 and a rotor assembly 853 each positioned about centerline 852. Portions of the stator assembly 851 and the rotor assembly 853 are operable with each other to form an aspirating seal assembly 854. More specifically, the aspirating seal assembly 854 includes a face seal 856 of the stator assembly 851, and a rotor 801 of the rotor assembly 853. The face seal 856 includes a first annular seal surface 860, and the rotor 801 includes a second annular seal surface 862 positioned adjacent to the first annular seal surface 860 to define a seal interface 864.

The aspirating seal assembly 854 also includes a gas bearing 800 coupled to a radially extending portion 866 of the face seal 856. The gas bearing 800 is configured to interface with a radially extending portion 868 of the rotor 801. Specifically, the radially extending portion 868 includes a rotor surface 822 facing a bearing surface 808 positioned adjacent to the rotor surface 822 to define a gap 820. The gas bearing 800 may be of any suitable configuration as discussed earlier with reference to FIGS. 1-12. As mentioned earlier, the gas bearing 800 includes a bearing body 802, a first through-hole 804, and a plurality of second through-holes 806.

The aspirating seal assembly 854 further includes a plurality of components positioned between the stator assembly 851 and the rotor assembly 853. In some embodiments, the plurality of components includes a primary tooth 872, a stator tooth 876, and a return channel 874 extending radially there through the gas bearing 800. The combination of the primary tooth 872 extending between the first and second annular surfaces 860, 862 and the return channel 874 is such that a flow of gas discharged from face seal 856 induces a pressure drop across the seal interface 864 and a leakage flow path 878. In some embodiments, the leakage flow path 878 extends along the seal interface 864 towards the fluid return channel 874. The stator tooth 876 is positioned upstream from the primary tooth 872 relative to the gas bearing 800, and may facilitate inducing a pressure drop across the seal interface 864 when machine 850 is in startup operation.

The gas bearing 800 injects a first pressurized gas through the first through-hole 804, and a second pressurized gas through the plurality of second through-holes 806 against the rotor surface 822. The first pressurized gas forms a layer of the first pressurized gas in the gap 820 and the second pressurized gas forms at least one stagnation region around a portion of the layer to prevent at least a portion of the first pressurized gas to leak through the gap 820. Thus, in some embodiments, the gas bearing 800 ensures that the bearing surface 808 does not contact the rotor surface 822.

In one embodiment a method of increasing a load bearing capacity of a gas bearing included in an aspirating seal assembly is disclosed. The method includes rotating a rotor of a rotor assembly, wherein the rotor is disposed within a stator assembly of a machine, and injecting a first pressurized gas from the gas bearing against a rotor surface through a first through-hole disposed in a bearing body of the gas bearing. The first through-hole is characterized by a size and a first central axis. The method further includes forming a layer of the first pressurized gas in a gap defined between the rotor surface and a bearing surface opposite to the rotor surface, and injecting a second pressurized gas from the gas bearing against the rotor surface through a plurality of second through-holes spaced apart from each other and disposed around the first through-hole. Each second through-hole is characterized by a size and a second central axis. Further, the method includes forming at least one region of the second pressurized gas around the first through-hole such that the at least a portion of the first pressurized gas is substantially blocked from leaking through the gap. The second central axis of each second through-hole in the plurality of second through-holes intersects the first central axis at an angle in a range from about 30 degrees to about 150 degrees or at an angle in a range from about −30 degrees to about −150 degrees. Further a size of at least one through-hole in the plurality of second through-holes is different from the size of the first through-hole.

Figure 13:
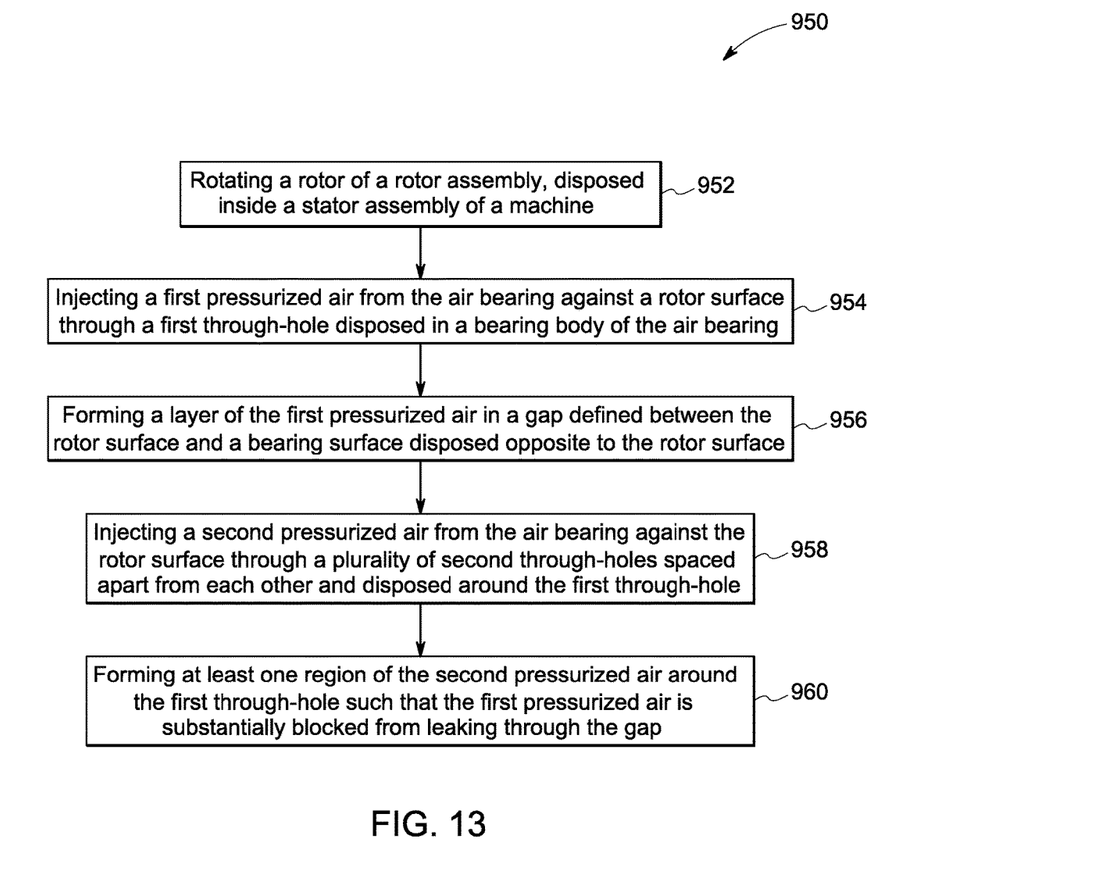
FIG. 13 is a flow chart for a method of increasing a load bearing capacity of a gas bearing included in an aspirating seal assembly, in accordance with one embodiment.

FIG. 13 illustrates a method 950 of increasing a load bearing capacity of a gas bearing (as shown in the embodiments of FIGS. 1-11) included in an aspirating seal assembly 854 (as shown in FIG. 12) is disclosed. Referring to FIGS. 1-12, in one embodiment, the method 950 includes, at step 952, rotating a rotor of a rotor assembly 853, where the rotor is disposed within a stator assembly 851 of a machine 850. In one embodiment, the method 950 includes, at step 954, injecting a first pressurized gas from the gas bearing 800 against a rotor surface 822 through a first through-hole 804 disposed in a bearing body 802 of the gas bearing 800. In such embodiments, the first through-hole 804 is characterized by a size "$S_1$" and a first central axis "$C_1$". In one embodiment, the method 950 includes, at step 956, forming a layer of the first pressurized gas (as shown in FIG. 2) in a gap 820 defined between the rotor surface 822 and a bearing surface 808 disposed opposite to the rotor surface 822.

In one embodiment, the method 950 includes, at step 958, injecting a second pressurized gas from the gas bearing 800 against the rotor surface 822 through a plurality of second through-holes 806 spaced apart from each other and disposed around the first through-hole 804. In such embodiments, each second through-hole 806 is characterized by a size "$S_2$" and a second central axis "$C_2$". In one embodiment, the method 950 includes, at step 960, forming at least one region of the second pressurized gas (as shown in FIG. 2) around the first through-hole 804 such that the first pressurized gas is substantially blocked from leaking through the gap 820. In all such embodiments, the second central axis "$C_2$" of each second through-hole in the plurality of second through-holes 806 intersects the first central axis "$C_1$" at an angle in a range from about 30 degrees to about 150 degrees or at an angle in a range from about −30 degrees to about −150 degrees, and a size "$S_2$" of at least one through-hole in the plurality of second through-holes 806 is different from the size "$S_1$" of the first through-hole 804.

The method 950 further includes a step of circulating at least a portion of one of the first pressurized gas and the second pressurized gas between the first through-hole 804 and the plurality of second through-holes 806, via a plurality of grooves (as shown in FIGS. 3-6) formed on the bearing surface 808. Further, the method 950 includes a step of feeding at least a portion of the second pressurized gas (as shown in FIGS. 9-11) disposed within at least one second through-hole in the plurality of second through-holes 806. In such embodiments, the porous material extends beyond the bearing surface 808 into the gap 820. In some embodiments, the porous material may be disposed such that the porous material is flush with the bearing surface 808 (not shown in figures). The method 950 further includes a step of blocking the second pressurized gas from the plurality of second through-holes through an abradable material (as shown in FIGS. 7-8) disposed along the bearing surface, around a counter bore, and over the plurality of second through-holes 806, wherein the counter bore is disposed around the first through-hole 804.

In accordance with some embodiments discussed herein, a gas bearing system provides an improved load capacity without affecting stability and robustness of the gas bearing to rubs or contacts with a rotor. In some such embodiments, the gas bearing may be capable of functioning without a counter bore while still providing the load bearing capacity at larger clearance/gap (about 1 mil to about 20 mils). Further, the gas bearing may enable controlling the injection rate of a pressurized gas by varying the size of one or more through-holes and by circulating the pressurized gas between the through-holes via a plurality of grooves. In some embodiments, the gas bearing further includes an abradable material disposed in the plurality of second through-holes to prevent erosion of the gas bearing during a rubbing event. In some other embodiments, the gas bearing includes a porous material disposed in one or more second through-holes to prevent erosion of the gas bearing during a rubbing event. Porosity of the porous material allows the pressurized gas to be still injected at a slower rate and maintains the gap between the opposing surfaces. An aspirating seal assembly comprised of the gas bearing may effectively control leakage of a pressurized gas between an area of relatively high pressure and an area of relatively low pressure, in some embodiments.

While only certain features of embodiments have been illustrated and described herein, many modifications and changes will occur to those skilled in the art. It is, therefore, to be understood that the appended claims are intended to cover all such modifications and changes as falling within the spirit of the invention.

The invention claimed is:

1. A gas bearing comprising:
a bearing body comprising a bearing surface;
a first through-hole disposed in the bearing body, wherein the first through-hole is characterized by a size and a first central axis, and is configured to form a layer of a first pressurized gas in a gap defined between the bearing surface and a rotor surface opposite to the bearing surface;
a plurality of second through-holes spaced apart from each other and disposed around the first through-hole, wherein each second through-hole is characterized by a size and a second central axis, and the plurality of second through-holes is configured to form at least one region of a second pressurized gas around the first through-hole such that at least a portion of the first pressurized gas is substantially blocked from leaking through the gap; and
a plurality of grooves disposed on the bearing surface, wherein the first through-hole is connected with at least some of second through-holes of the plurality of second through-holes via the plurality of grooves, at least some of second through-holes of the plurality of second through-holes are connected to each other via the plurality of grooves, or combinations thereof,
wherein the second central axis of each second through-hole in the plurality of second through-holes intersects the first central axis at an angle in a range from about 30 degrees to about 150 degrees or at an angle in a range from about −30 degrees to about −150 degrees, and wherein a size of at least one through-hole in the plurality of second through-holes is different from the size of the first through-hole.

2. The gas bearing of claim 1, wherein the size of the first through-hole is greater than the size of the at least one through-hole in the plurality of second through-holes.

3. The gas bearing of claim 1, further comprising a plurality of third through-holes spaced apart from each other and aligned along the first central axis, wherein at least one through-hole in the plurality of third through-holes is characterized by a size substantially equal to the size of the first through-hole.

4. The gas bearing of claim 3, wherein the plurality of grooves connects at least some of the plurality of second through-holes with the first through-hole and at least some of the plurality of third through-holes.

5. The gas bearing of claim 3, wherein the plurality of grooves connects the first through-hole with at least some of third through-holes in the plurality of third through-holes.

6. The gas bearing of claim 1, further comprising a counter bore disposed around the first through-hole and in gas communication with the first through-hole and an abradable material disposed along the bearing surface, around the counter bore, and over the plurality of second through-holes.

7. The gas bearing of claim 1, wherein at least one second through-hole in the plurality of second through-holes has a first portion characterized by a first size and a second portion characterized by a second size, wherein the first size is different from the second size, wherein the first portion comprises a porous material.

8. The gas bearing of claim 1, further comprising a porous material disposed within at least one second through-hole in the plurality second through-holes, wherein the porous material has a first portion characterized by a first thickness and a second portion characterized by a second thickness different from the first thickness.

9. The gas bearing of claim 1, wherein the gas bearing is comprised in an aspirating seal assembly.

10. The gas bearing of claim 1, wherein at least one of the first pressurized gas and the second pressurized gas comprises air.

11. A machine, comprising:
a stator assembly;
a rotor assembly comprising a rotor disposed within the stator assembly; and
an aspirating seal assembly coupled to the stator assembly and disposed between the stator assembly and the rotor, wherein the aspirating seal assembly comprises a plurality of components and a gas bearing, wherein the gas bearing comprises:
a bearing body comprising a bearing surface;
a first through-hole disposed in the bearing body, wherein the first through-hole is characterized by a size and a first central axis, and is configured to form a layer of a first pressurized gas in a gap defined between the bearing surface and the rotor surface opposite to the bearing surface; and
a plurality of second through-holes spaced apart from each other and disposed around the first through-hole, wherein each second through-hole is characterized by a size and a second central axis, and the plurality of second through-holes is configured to form at least one region of a second pressurized gas around the first through-hole such that at least a portion of the first pressurized gas is substantially blocked from leaking through the gap,
wherein the second central axis of each second through-hole in the plurality of second through-holes intersects the first central axis at an angle in a range from about 30 degrees to about 150 degrees or at an angle in a range from about −30 degrees to about −150 degrees, and wherein a size of at least one through-hole in the plurality of second through-holes is different from the size of the first through-hole.

12. The machine of claim 11, further comprising a plurality of third through-holes spaced apart from each other and aligned along the first central axis, wherein at least one through-hole in the plurality of third through-holes is characterized by a size substantially equal to the size of the first through-hole.

13. The machine of claim 12, further comprising a plurality of grooves disposed on the bearing surface, and connecting at least some of the plurality of second through-holes with the first through-hole and at least some of the plurality of third through-holes.

14. The machine of claim 12, further comprising a plurality of grooves disposed on the bearing surface, and connecting the first through-hole with at least some of the third through-holes in the plurality of third through-holes.

15. The machine of claim 11, further comprising a plurality of grooves disposed on the bearing surface, and connecting at least some of the second through-holes in the plurality of second through-holes.

16. The machine of claim 11, further comprising a counter bore disposed around the first through-hole and in gas communication with the first through-hole hole and an abradable material disposed along the bearing surface, around the counter bore, and over the plurality of second through-holes.

17. The machine of claim 11, wherein at least one second through-hole in the plurality of second through-holes has a first portion characterized by a first size and a second portion characterized by a second size, wherein the first size is different from the second size.

18. The machine of claim 11, further comprising a porous material disposed within at least one second through-hole in the plurality of second through-holes, wherein the porous material has a first portion characterized by a first thickness and a second portion characterized by a second thickness different from the first thickness.

19. The machine of claim 11, wherein at least one of the first pressurized gas and the second pressurized gas comprises air.

20. A method of increasing a load bearing capacity of a gas bearing comprised in an aspirating seal assembly, comprising:

rotating a rotor of a rotor assembly, wherein the rotor is disposed within a stator assembly of a machine;

injecting a first pressurized gas from the gas bearing against a rotor surface through a first through-hole disposed in a bearing body of the gas bearing, wherein the first through-hole is characterized by a size and a first central axis;

forming a layer of the first pressurized gas in a gap defined between the rotor surface and a bearing surface opposite to the rotor surface;

injecting a second pressurized gas from the gas bearing against the rotor surface through a plurality of second through-holes spaced apart from each other and disposed around the first through-hole, wherein each second through-hole is characterized by a size and a second central axis; and forming at least one region of the second pressurized gas around the first through-hole such that at least a portion of the first pressurized gas is substantially blocked from leaking through the gap, wherein the second central axis of each second through-hole in the plurality of second through-holes intersects the first central axis at an angle in a range from about 30 degrees to about 150 degrees or at an angle in a range from about −30 degrees to about −150 degrees, and wherein a size of at least one through-hole in the plurality of second through-holes is different from the size of the first through-hole.

21. The method of claim 20, further comprising circulating at least a portion of one of the first pressurized gas and the second pressurized gas between the first through-hole and the plurality of second through-holes, via a plurality of grooves formed on the bearing surface.

22. The method of claim 20, wherein injecting a second pressurized gas further comprises injecting at least a portion of the second pressurized gas through a porous material disposed within at least one second through-hole in the plurality of second through-holes.

23. The method of claim 20, further comprising blocking the flow of second pressurized gas from the plurality of second through-holes via an abradable material disposed along the bearing surface, around a counter bore, and over the plurality of second through-holes, wherein the counter bore is disposed around the first through-hole.

* * * * *